United States Patent
Suchy et al.

(10) Patent No.: US 10,663,568 B2
(45) Date of Patent: May 26, 2020

(54) COMPOSITE ACOUSTIC BURSTS FOR MULTI-CHANNEL SENSING

(71) Applicant: SEMICONDUCTOR COMPONENTS INDUSTRIES, LLC, Phoenix, AZ (US)

(72) Inventors: Tomas Suchy, Brno (CZ); Miroslav Kassa, Rajhrad (CZ); Marek Hustava, Bratislava (SK)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 353 days.

(21) Appl. No.: 15/888,471

(22) Filed: Feb. 5, 2018

(65) Prior Publication Data
US 2019/0025415 A1    Jan. 24, 2019

Related U.S. Application Data

(60) Provisional application No. 62/534,596, filed on Jul. 19, 2017.

(51) Int. Cl.
| | |
|---|---|
| *G01S 7/527* | (2006.01) |
| *G01S 7/53* | (2006.01) |
| *G01S 15/93* | (2020.01) |
| *G01S 15/931* | (2020.01) |
| *G01S 15/10* | (2006.01) |

(52) U.S. Cl.
CPC ............. *G01S 7/5273* (2013.01); *G01S 7/53* (2013.01); *G01S 15/104* (2013.01); *G01S 15/931* (2013.01); *G01S 2015/938* (2013.01)

(58) Field of Classification Search
CPC ........ G01S 7/5273; G01S 15/104; G01S 7/53; G01S 15/931; G01S 2015/938
See application file for complete search history.

(56) References Cited

U.S. PATENT DOCUMENTS

| | | |
|---|---|---|
| 2016/0154104 A1 | 6/2016 | Schumann et al. |
| 2018/0031701 A1 | 2/2018 | Hustava et al. |
| 2019/0025415 A1* | 1/2019 | Suchy ................ G01S 7/53 |

FOREIGN PATENT DOCUMENTS

| | | | |
|---|---|---|---|
| DE | 202018103861 U1 * | 8/2018 | ........... G01S 15/104 |
| EP | 1231481 A2 | 8/2002 | |

* cited by examiner

*Primary Examiner* — Daniel Pihulic
(74) *Attorney, Agent, or Firm* — Ramey & Schwaller, LLP

(57) ABSTRACT

Composite burst signaling to provide robust multi-channel sensor array performance in systems for parking assistance, blind spot monitoring, and driver assistance. An illustrative method embodiment includes driving an acoustic transducer to send composite acoustic bursts. Each composite acoustic burst includes multiple individual bursts associated with respective frequency bands, the frequency band arrangement providing a source-specific burst signature. The method further includes receiving self-generated echo signals responsive to the composite acoustic bursts from the transducer and potentially including extra echoes responsive to acoustic bursts from other sources; categorizing received echo signals by source based on the burst signature; and using the self-generated echoes exclusive of the extra echoes to determine a distance or time of flight from the transducer.

23 Claims, 6 Drawing Sheets

COMPOSITE ACOUSTIC BURSTS FOR MULTI-CHANNEL SENSING

CROSS-REFERENCE TO RELATED APPLICATIONS

The present application claims priority to Provisional U.S. Application 62/534,596, titled "Multi-channel Park Assist with Magnitude Equalization" and filed 2017 Jul. 19 by inventors Tomas Suchy, Miroslav Kassa, and Marek Hustava. This provisional application is hereby incorporated herein by reference.

BACKGROUND

Modern automobiles are equipped with an impressive number and variety of sensors. For example, cars are now routinely equipped with arrays of ultrasonic sensors to monitor the distance between the car and any nearby persons, pets, vehicles, or obstacles. Due to environmental "noise" and safety concerns, each of the sensors may be asked to provide tens of measurements each second while the car is in motion. It is important for such sensor arrays to perform reliably.

As the number of sensors increases, so too does the need for the sensors to operate concurrently, increasing the risk of interference between the sensors. Because acoustic bursts from multiple sensors may be "in flight" at the same time, the echoes from bursts by a first sensor may be detected by other sensors and become erroneously associated with other bursts, leading to incorrect time-of-flight determinations and erroneous distance measurements. Various approaches proposed for multi-channel co-existence fail to adequately address the unbalanced attenuation experienced by different signal frequencies, which can adversely affect time-of-flight determinations.

SUMMARY

Accordingly, there are disclosed herein various sensors, sensor controllers, and sensor control methods suitable for use in a multi-channel ultrasonic sensor array such as those used in systems for parking assistance, blind spot monitoring, and driver assistance. An illustrative method embodiment includes driving an acoustic transducer to send composite acoustic bursts. Each composite acoustic burst includes multiple individual bursts associated with respective frequency bands, the frequency band arrangement providing a source-specific burst signature. The method further includes receiving self-generated echo signals responsive to the composite acoustic bursts from the transducer and potentially including extra echoes responsive to acoustic bursts from other sources; categorizing received echo signals by source based on the burst signature; and using the self-generated echoes exclusive of the extra echoes to determine a distance or time of flight from the transducer.

An illustrative sensor embodiment includes an acoustic transducer and a controller. The acoustic transducer sends composite acoustic bursts having a burst signature and that receives echo signals, the echo signals including self-generated echoes responsive to the composite acoustic bursts from the transducer and potentially including extra echoes responsive to acoustic bursts from other sources. Each composite acoustic burst includes multiple individual bursts in respective frequency bands, the frequency band arrangement providing a source-specific burst signature. The controller categorizes the received echo signals by source based on the burst signature and determines a distance or time of flight from the transducer using only the self-generated echoes.

An illustrative sensor array embodiment includes: an electronic control unit, a first acoustic transducer, and a second acoustic transducer. Each acoustic transducer sends composite acoustic bursts having a source-specific burst signature, and receives echo signals including self-generated echoes responsive to the composite acoustic bursts from that transducer. Each composite acoustic burst comprises multiple individual bursts each having an associated frequency band, with the source-specific burst signatures having distinct arrangements of associated frequency bands. Each of the acoustic transducers includes a center band correlation filter and at least one of an upper band correlation filter and a lower band correlation filter. The electronic control unit receives output signals from the correlation filters, categorizes the received echo signals based on the burst signatures, and determines a distance or time of flight from each of the transducers using only their self-generated echoes.

Each of the foregoing embodiments may be employed individually or conjointly, and (as reflected by the claims) they may further employ one or more of the following optional features in any suitable combination: 1. the categorizing includes identifying extra echoes responsive to composite acoustic bursts having a second burst signature associated with a second sensor. 2. determining, based on the identified extra echoes, a distance or time of flight from the second sensor. 3. at least one frequency band in the burst signature is a center band of the transducer. 4. at least one frequency band in the burst signature is a lower band frequency of the transducer. 5. at least one frequency band in the burst signature is an upper band of the transducer. 6. the composite acoustic burst consists of two individual bursts. 7. the second of the two individual bursts begins before residual reverberation of a first individual burst ceases. 8. the burst signature further comprises a source-specific inter-burst interval. 9. the acoustic transducer is a piezoelectric element. 10. the arrangement of associated frequency bands for the first burst signature is an upper band and a center band, and the arrangement for the second burst signature is a lower band and the center band. 11. each composite acoustic burst consists of two individual bursts with no inter-burst space. 12. each of the first and second transducers supplies output signals from an upper band correlation filter, a center band correlation filter, and a lower band correlation filter.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Figure 1:
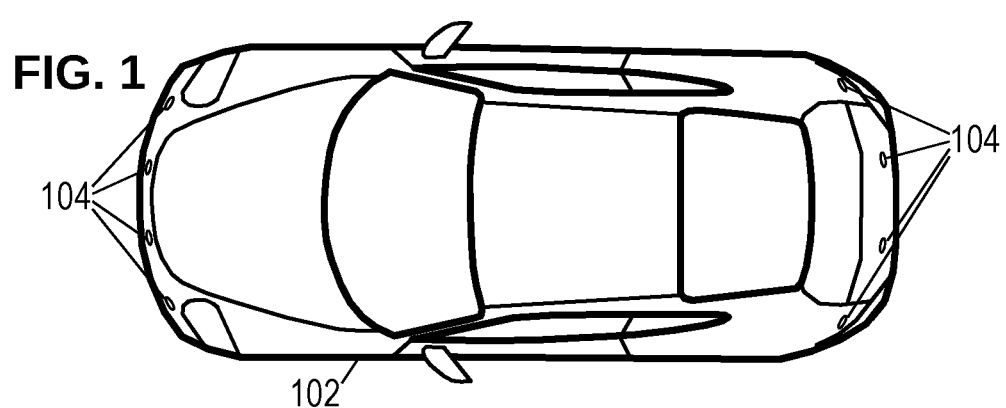
FIG. 1 is an overhead view of an illustrative vehicle equipped with parking-assist sensors.

To provide context, FIG. 1 shows an illustrative vehicle 102 equipped with a set of ultrasonic parking-assist sensors 104. The number and configuration of sensors in the sensor arrangement varies, and it would not be unusual to have six sensors on each bumper with two additional sensors on each side for blind-spot detectors on each side. The vehicle may employ the sensor arrangement for detecting and measuring distances to objects in the various detection zones, using the sensors for individual measurements as well as cooperative (e.g., triangulation, multi-receiver) measurements.

The ultrasonic sensors are preferably transceivers, meaning that each sensor can transmit and receive bursts of ultrasonic sound. Emitted bursts propagate outward from the vehicle until they encounter and reflect from an object or some other form of acoustic impedance mismatch. The reflected bursts return to the vehicle as "echoes" of the emitted bursts. The times between the emitted bursts and received echoes are indicative of the distances to the reflection points. In many systems, only one sensor transmits at a time, though all of the sensors may be configured to measure the resulting echoes. However, the present disclosure provides a way to support multiple simultaneous transmissions through the use of composite bursts with distinctive signatures.

Figure 2:
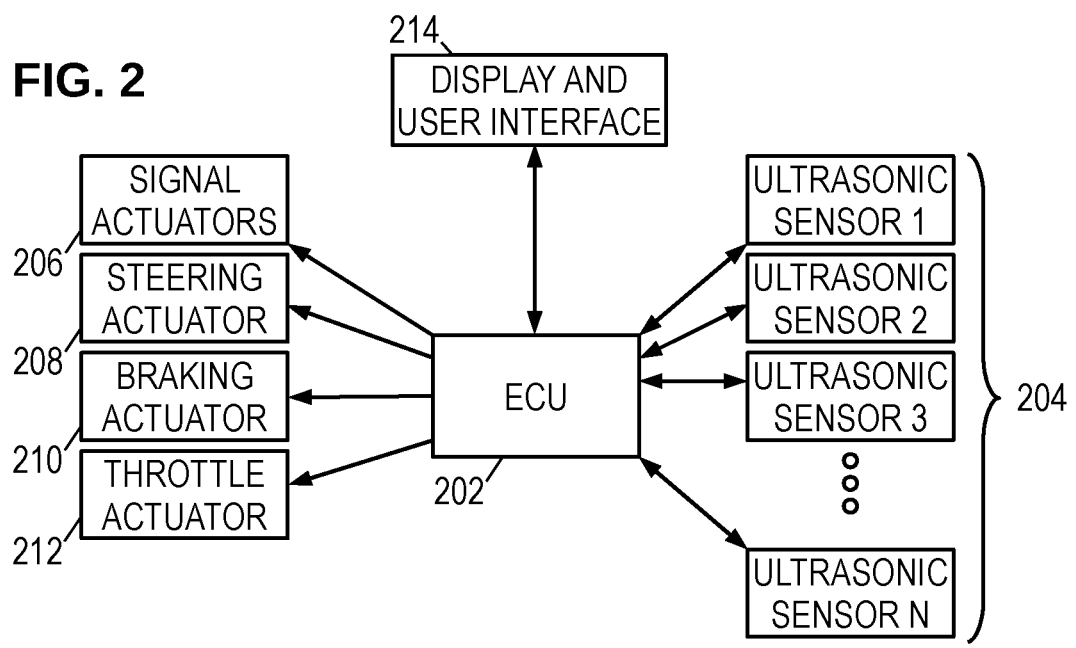
FIG. 2 is a block diagram of an illustrative parking assist system.

FIG. 2 shows an electronic control unit (ECU) 202 coupled to the various ultrasonic sensors 204 as the center of a star topology. Of course, other topologies including serial, parallel, and hierarchical (tree) topologies, are also suitable and contemplated for use in accordance with the principles disclosed herein. To provide automated parking assistance, the ECU 202 may further connect to a set of actuators such as a turn-signal actuator 206, a steering actuator 208, a braking actuator 210, and throttle actuator 212. ECU 202 may further couple to a user-interactive interface 214 to accept user input and provide a display of the various measurements (including the presence of, and/or distance to, nearby objects) and system status. Using the interface, sensors, and actuators, ECU 202 may provide automated parking, assisted parking, lane-change assistance, obstacle and blind-spot detection, and other desirable features.

Figure 3:
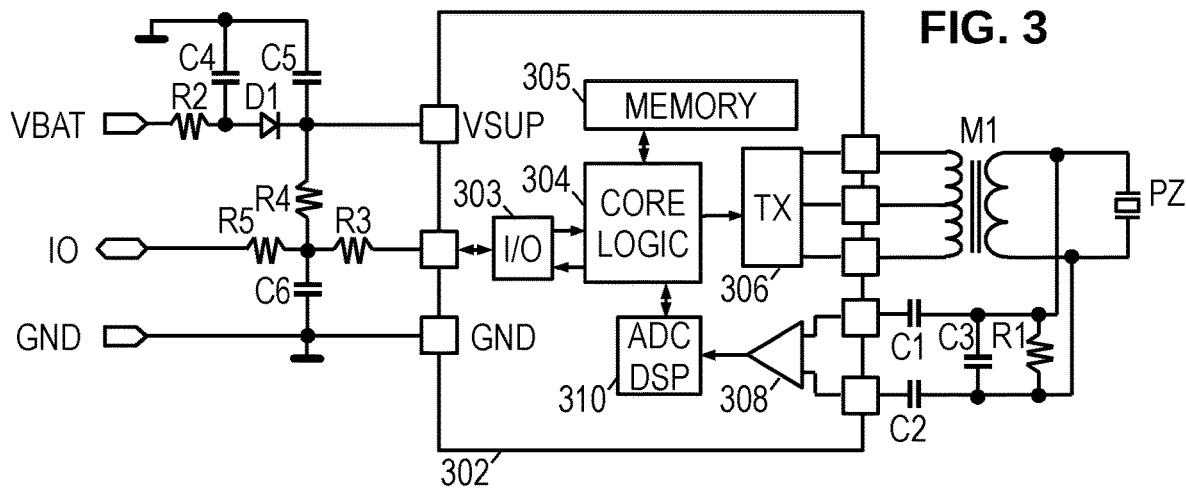
FIG. 3 is a circuit schematic of an illustrative parking-assist sensor.

One potential sensor configuration is now described with reference to FIGS. 3 and 4. In practice, the sensors may employ any of a number of suitable communication and power supply techniques such as those provided in the DSI3, LIN, and CAN standards. Some of these standards support data communication via the power conductors, or via multiple bus conductors. However, in the illustrated embodiment of FIG. 3, the sensor controller 302 connects only to two power terminals (Vbat and GND) and a single input/output ("I/O" or "IO") line for bidirectional communication with the ECU 202.

The sensor controller 302 includes an I/O interface 303 that, when placed in a recessive mode, monitors the I/O line for communication from the ECU 202 and, when placed in a dominant mode, drives the I/O line to send measurements or other information to the ECU 202.

The sensor controller 302 includes a core logic 304 that operates in accordance with firmware and parameters stored in nonvolatile memory 305 to parse commands from the ECU and carry out the appropriate operations, including the transmission and reception of ultrasonic bursts. To transmit an ultrasonic burst, the core logic 304 is coupled to a transmitter 306 which drives a set of transmit terminals on the sensor controller 302. The transmitter terminals are coupled via a transformer M1 to a piezoelectric element PZ. The transformer M1 steps up the voltage from the sensor controller (e.g., 12 volts) to a suitable level for driving the piezoelectric element (e.g., tens of volts). The piezoelectric element PZ has a resonance frequency that is tuned to a desirable value (e.g., 48 kHz) with a parallel capacitor C3, and has a resonance quality factor (Q) that is tuned with a parallel resistor R1. One illustrative purpose of the tuning capacitor and tuning resistor is to tune the parallel resonance frequency close to the series resonant frequency of the piezoelectric element. (Though an ultrasonic frequency is provided here as an example, any acoustic frequency suitable for burst propagation may be employed.)

As used herein, the term "piezoelectric transducer" includes not only the piezoelectric element, but also the supporting circuit elements for driving, tuning, and receiving from, the piezoelectric element. In the illustrative embodiment, these supporting elements are the transformer M1, the tuning resistor and tuning capacitor, and the DC-isolation capacitors. Optionally, output and input capacitance of the transmitter 306 and amplifier 308, respectively, may also be included as parasitic characteristics of the supporting circuit elements considered to be part of the transducer. However, the use of the term "piezoelectric transducer" does not necessarily require the presence of any supporting circuit elements, as a piezoelectric element may be employed alone without such supporting elements.

A pair of DC-isolation capacitors C1, C2 couple the piezoelectric element to the sensor controller's pair of receive terminals to protect against high voltages. Further protection is provided with internal voltage clamps on the receive terminals. Such protection may be desired for the intervals when the piezoelectric element is transmitting. As the received echo signals are typically in the millivolt or microvolt range, a low-noise amplifier 308 amplifies the signal from the receive terminals. The amplified receive signal is digitized and processed by a digital signal processor (DSP) 310 with an integrated analog-to-digital converter (ADC).

DSP 310 applies programmable methods to measure the actuation period of the piezoelectric transducer during the transmission of a burst (including the ensuing reverberation or "ringing" period), and to detect and measure the timing of any received bursts or "echoes". Such methods may employ filtering, correlation, threshold comparisons, minimum intervals, peak detections, zero-crossing detection and counting, noise level determinations, and other customizable techniques tailored for improving reliability and accuracy. The DSP 310 may further process the amplified receive signal to analyze characteristics of the transducer, such as resonance frequency and quality factor, and may further detect transducer fault states.

Some fault states may be indicated by, e.g., an excessively short actuation period (which may be due to a disconnected or defective transducer, suppressed vibration, or the like), while others may be indicated by an excessively long actuation period (defective mounting, inadequate damping resistance, or the like). In addition to the transducer fault states that may be detected by the DSP 310, the core logic may monitor other sensor error conditions such as having the supply voltage "under-voltage" or "over-voltage" while transmitting an ultrasonic burst, thermal shutdown of transmitter, a hardware error, an incomplete power-on reset, or the like. The core logic 304 may detect and classify multiple such transducer fault states and error conditions, storing the appropriate fault codes in internal registers or nonvolatile memory 305. Commands received via the I/O line trigger the core logic 304 to operate the transmitter and receiver and provide the measurement results to the ECU 202 via the I/O line, potentially accompanied by status bits or fault codes.

Figure 4:
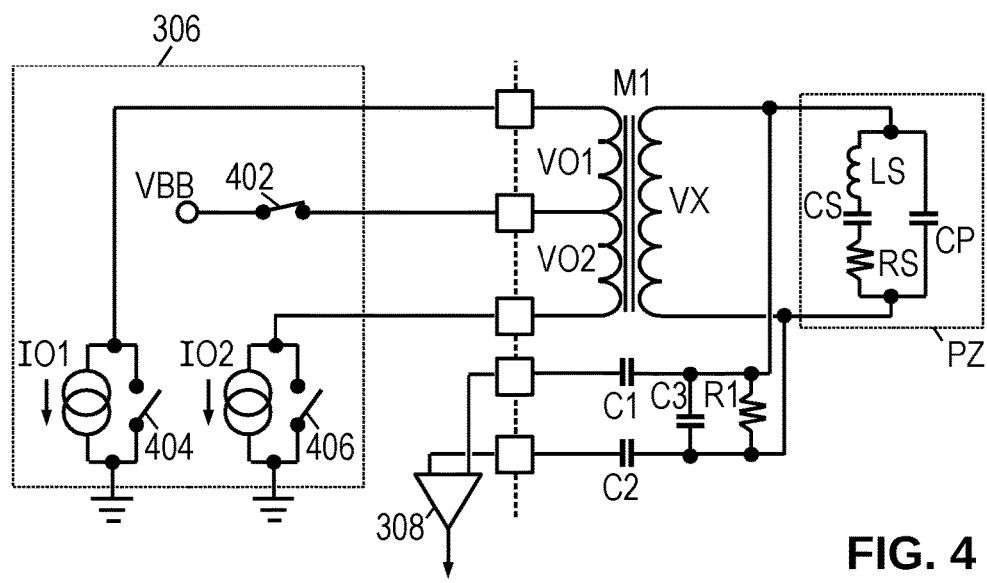
FIG. 4 is a schematic of an equivalent circuit with added transmitter detail.

FIG. 4 is a circuit schematic in which the piezoelectric element PZ is replaced by an equivalent circuit representation of a parallel capacitor CP coupled in parallel with a series combination of a series inductor LS, a series capacitor CS, and a series resistor RS. The series combination represents mechanical action of the piezoelectric element, with RS representing the element's energy loss (which during normal operation is primarily due to the radiated acoustic energy). FIG. 4 also provides additional detail for an illustrative implementation of transmitter 306.

During the driving stage of transmitting an acoustic burst, switch 402 is closed, coupling a supply voltage VBB to a center tap on the primary of transformer M1. Current sources 101 and 102 alternately drive current in opposite directions from the center tap to the end taps on the primary of transformer M1, producing an alternating voltage VX on the secondary of transformer M1. The secondary voltage VX is coupled to the terminals of piezoelectric element PZ. Note that the turn ratio of the transform M1 makes the alternating secondary voltage VX directly proportional to the sum of primary winding voltages VO1 and VO2. Consequently, the voltage between the terminals of the piezoelectric element can be determined by measuring the voltages on primary windings, though in the discussion below the measurement is described as being made across the secondary winding.

When the driving stage of transmitting an acoustic burst is complete, switch 402 is opened. The piezoelectric transducer will continue to reverberate after the driving stage, with a gradual decay of the reverberation amplitude. It is often desired to minimize the length of this reverberation stage, and accordingly a number of damping techniques may be employed as described in the public literature. In the illustrated implementation, switches 404 and 406 are closed, effectively "shorting" the transducer by creating a low-impedance path between the taps of the transformer primary. Once the reverberation is adequately damped, switches 404 and 406 may be opened to enable amplifier 308 to begin collecting signal measurements.

Figure 5A:
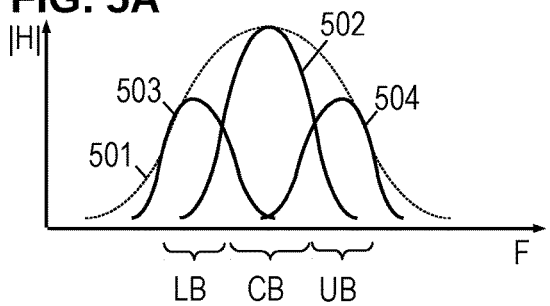
FIGS. 5A-5D are spectral signatures for four illustrative composite bursts.

With the foregoing context, we turn to the potential interference between echoes returning from multiple sensors operating in parallel. To enable each sensor to distinguish self-generated echoes from potentially interfering echoes from other sources, the sensors preferably generate their bursts with distinctive signatures. FIG. 5A is a graph of a passband 501 for an illustrative piezoelectric transducer. In at least some embodiments, the 3 dB width of the passband is approximately 6 kHz. (The center frequency varies, and may typically reside in the 25 kHz to 75 kHz range.) The passband may be divided into bands, including a center band (CB) that is centered within the passband 501 and occupies about half of it, i.e., accommodating a signal spectrum 502 with a 3 dB bandwidth of approximately 3 kHz. A lower band (LB) may be centered at the lower 3 dB point of the passband 501, so that the passband accommodates an upper sideband of a signal spectrum 503 with adequate separation from the CB spectrum 502. Similarly, an upper band (UB) may be centered at the upper 3 dB point of the passband, so that the passband 501 accommodates a lower sideband of a signal spectrum 504, again with adequate separation from the CB spectrum 502. (At least some band separation is desired to allow for Doppler shifts due to motion of the sensors.) Each of the spectra 502, 503, 504 may initially have the same 3 kHz bandwidth, though the passband's unbalanced attenuation is expected to distort the signal spectra in the upper and lower bands.

Figure 5B:
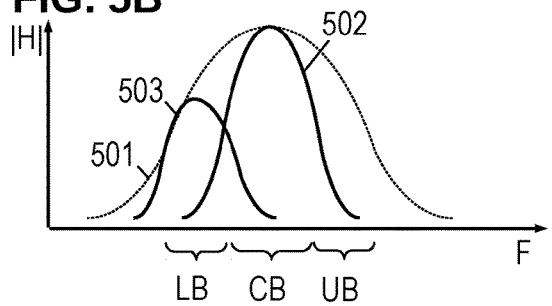
Figure 5C:
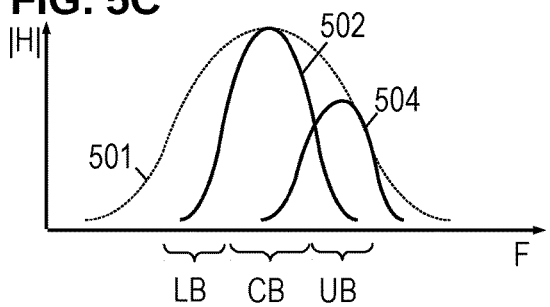
Figure 5D:
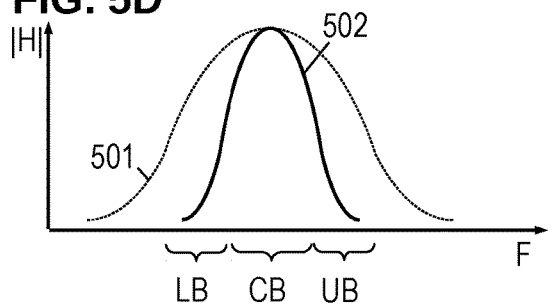

Each of the sensors may employ acoustic burst energy in the center band to capture time of flight measurements, relying on the presence or absence of energy in the upper and lower bands to distinguish between the bursts. Thus FIG. 5A shows a spectral signature having (in addition to the center band energy) both upper and lower band energy, FIG. 5B shows a spectral signature having lower band energy without upper band energy, FIG. 5C shows a spectral signature having upper band energy without lower band energy, and FIG. 5D shows a spectral signature without upper or lower band energy present. This contemplated approach provides four distinctive burst signatures that may be used to distinguish the echoes of up to four different sources while enabling each of the sources to collect measurements using center band energy (where the maximum signal-to-noise ratio can be obtained).

Figure 6A:
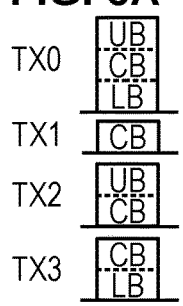
FIGS. 6A-6F show illustrative sets of composite burst signatures.

FIG. 6A shows four bursts, each having the different spectral signatures shown in FIGS. 5A-5D. These bursts may be generated by superimposing carrier frequencies or chirps from the three bands described previously. Thus, using "+" to represent superposition, "UB" to represent a carrier frequency, frequency chirp or other form of spectral energy in the upper band, and using "CB" and "LB" to similarly represent spectral energy in the center band and lower band respectively, the four sources have the following four burst signatures: (UB+CB+LB), CB, (UB+CB), and (CB+LB).

However, the sensor electronics are generally required to drive the piezoelectric transducers near the limits of the available power supply voltage. Because the multiple frequency components can interfere constructively, the superposition waveform may be difficult for the transmitter to generate because the constructive interference raises the required drive voltage well beyond the available power supply voltage (at least when the center band is included as one of the superimposed frequencies). Accordingly, the preferred approach is to employ a composite burst formed from multiple individual acoustic bursts sent sequentially, as variously shown in FIGS. 6B-6F.

Figure 6B:
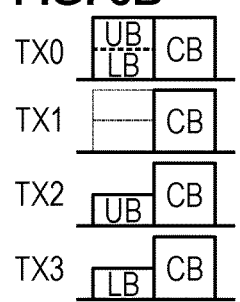

FIG. 6B shows a composite burst for a first source (TX0) using an individual acoustic burst with superimposed frequencies from the upper band and lower band (UB+LB), followed by a second acoustic burst in the center band (CB). Using "&" to represent sequential transmission, the burst signature for TX0 is (UB+LB)&CB. The composite burst signature for a second source (TX1) is also shown, employing only a single burst in the center band and omitting any bursts with upper or lower band energy, i.e., CB. For a third source (TX2), the composite burst includes a first burst with signal energy in the upper band only, followed by a second burst with signal energy in the center band only: UB&CB. For a fourth source (TX3), the composite burst includes an individual burst having spectral energy in the lower band, followed by a second burst having spectral energy in the center band: LB&CB.

Figure 6C:
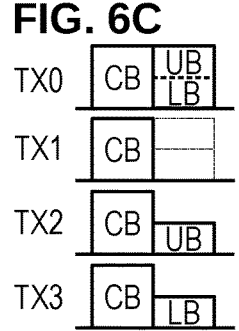

FIG. 6C shows a signal set which reverses the individual bursts of FIG. 6B: CB&(UB+LB), CB, CB&UB, and CB&LB. Thus, rather than concluding each composite burst with center band energy, the composite bursts end with the distinguishing portion of the burst signatures. The ordering of the individual bursts in the signature may impact the design or performance of the sensor at short range, since echoes from nearby reflectors (e.g., less than about 20 cm) can return during residual reverberation of the transducer, i.e., before the sensor begins receiving. In such circumstances, the sensor may only be able to measure the trailing portion of the composite burst. Where each burst ends with a center band signal, a single short-range correlator could be added to improve short range detection but cannot distinguish between signals from the different sources. (This may be suitable for sensor array designs where interference is unlikely at short range.) Where each burst ends with the distinguishing portion of the burst signatures, multiple short-range correlators would be needed to similarly improve the short-range performance, but advantageously the different sources could be distinguished.

Figure 6F:
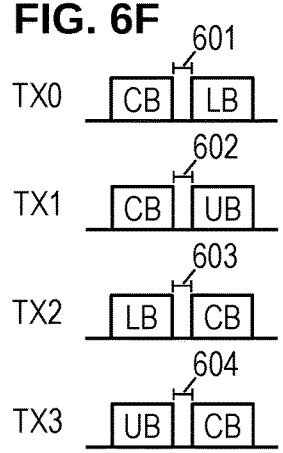
Figure 6D:
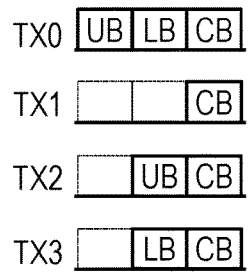
Figure 6E:
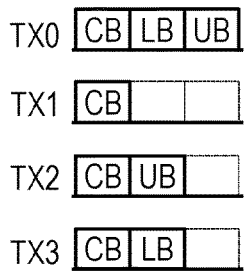

FIG. 6D shows a composite burst signature set that enables four sources to be distinguished without requiring any superposition. Rather, the composite burst is allowed to include up to three individual bursts. Thus the illustrated signatures are: UB&LB&CB, CB, UB&CB, and LB&CB. FIG. 6E shows a similar set with the order of individual bursts reversed so that each composite burst begins with the center band burst rather than ending with the center band burst.

The foregoing examples do not rely on burst order or timing for distinguishing different waveform sources. While this characteristic may be desirable for dense echo environments, it is not a requirement. Moreover, a non-zero inter-burst spacing may be included as part of the burst signature.

FIG. 6F shows a set of four burst signatures, each having two individual bursts with potentially variable inter-burst spacings 601-604 to distinguish an even greater number of sources. The burst signature for TX0 includes an inter-burst spacing 601 between a center band burst and a lower band burst (CB&LB). The signature for TX1 includes an inter-burst spacing 602 between a center band burst and an upper band burst (CB&UB). The signature for TX2 includes an inter-burst spacing 603 between a lower band burst and a center band burst (LB&CB), while the signature for TX3 includes an inter-burst spacing 604 between an upper band burst and a center band burst (UB&CB). (The term "spacing" is used herein to refer to the time between the end of the first burst and the beginning of the second. The term "interval" is used below to refer to the time between the beginnings of the first and the second bursts. So long as the burst length is known, these values may be used interchangeably.)

In at least some embodiments, the spacings 601-604 are minimized, so that the second burst begins immediately after the first (or at least before residual reverberation dies out from the first). However, any predetermined spacing may be used, so long as the second burst is not being transmitted during a potential arrival time of an echo to the first burst. Moreover, the inter-burst spacing can be different for different sources and may be used as an additional distinguishing factor to support the use of additional sources. Thus a composite burst signature may be made distinctive using three factors: the selection of frequency bands, the ordering of frequency bands, and the inter-burst spacing.

In at least some embodiments, the bursts comprise pure tones, i.e., carrier frequencies. In certain alternative embodiments, the bursts comprise rising or falling frequency chirps (potentially providing an additional distinguishing characteristic of the burst signature). At least some embodiments alternate between rising and falling chirps to enable robust burst detection as well as correction of Doppler shifts. Illustrative burst lengths are 0.64, 1.28, 2.8, and 5.6 ms. Illustrative inter-burst intervals may be approximately equal to the individual burst lengths to minimize the length of the composite burst. In embodiments where the inter-burst interval is employed as a distinguishing part of the signature, the interval may be an integer multiple of the burst length.

Figure 7A:
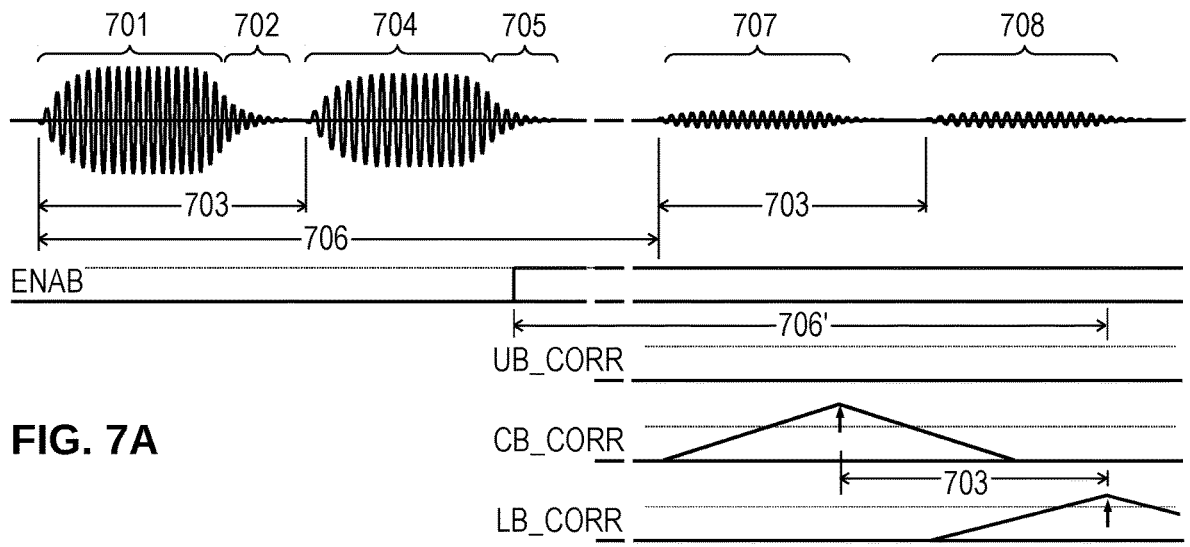
FIGS. 7A-7B are waveform timing diagrams for two illustrative composite bursts.
Figure 7B:
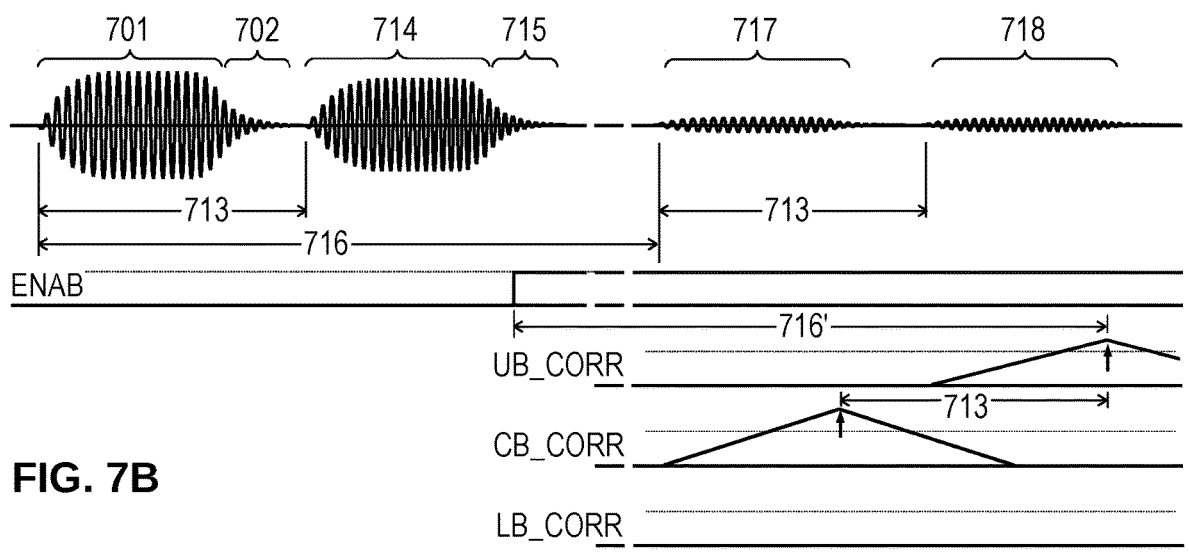

To further illustrate the use of burst signatures, FIGS. 7A-7B show waveform timings for the first two composite bursts of FIG. 6F. In FIG. 7A, composite burst transmission begins with a center-band burst 701 (a rising frequency chirp) that causes residual reverberation 702. After an inter-burst interval 703, a lower-band burst 704 is sent with residual reverberation 705. Once the residual reverberation 705 falls to a level where echo detection is possible, a measurement enable (ENAB) signal is asserted, and remains asserted for the duration of a predetermined measurement window where echoes may be detected. As the bursts 701 and 704 propagate, they may encounter obstacles that reflect some of the burst energy as echoes 707 and 708 which return after a time-of-flight 706 that corresponds to the intervening distance. The first echo 707 is responsive to the center-band burst 701, so that a correlation filter (or other form of center-band frequency waveform detector) produces a signal peak (CB_CORR) that indicates the presence of the echo when a detection threshold is exceeded. The second echo is responsive to the lower-band burst 704, so that a correlation filter (or other form of lower-band frequency waveform detector) produces a signal peak (LB_CORR) that indicates the presence of an echo at one inter-burst interval 703 after the CB_CORR peak. No significant response should be observed from an upper-band correlation filter (UB_CORR). Note that the elapsed time 706' between the assertion of the enable signal and the arrival of the second peak LB_CORR corresponds to the time of flight, though there may be some time offset that depends on the implementation of the filters.

FIG. 7B shows a composite burst transmission with an upper-band burst 714 being sent an inter-burst interval 713 after the center-band burst 701. Once the residual reverberation 715 is sufficiently attenuated, the enable signal is asserted and remains asserted for the duration of the measurement window. After a time of flight 716, the center-band echo 717 returns and is detected by the center-band correlator. An inter-burst interval 713 later, the upper-band echo 718 arrives and is detected by the upper-band correlator. The elapsed time 716' corresponds to the time of flight and hence the distance to the obstacle.

Figure 8:
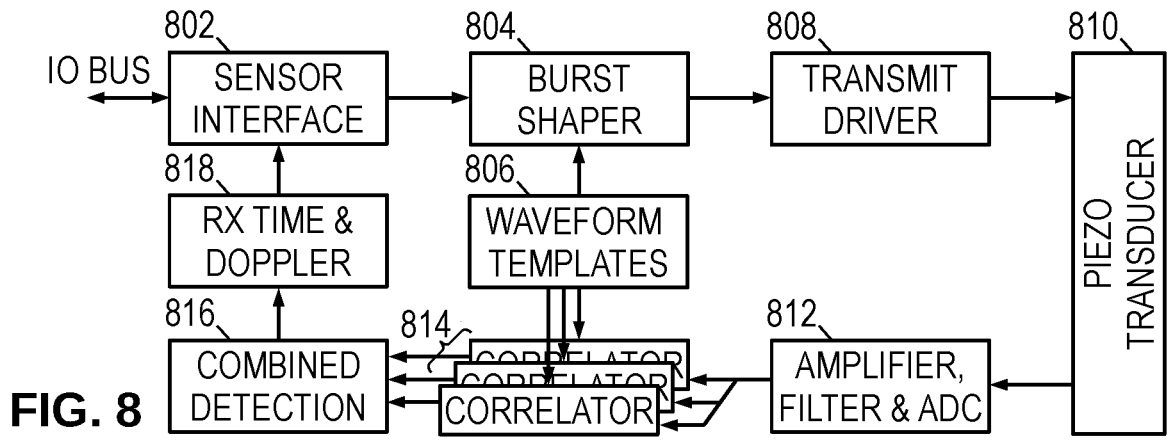
FIG. 8 is a function block diagram of an illustrative sensor.

To implement the process described above, the circuitry of FIGS. 3-4 may implement a series of function blocks such as those shown in FIG. 8. A sensor interface 802 communicates with a system controller to receive commands, initiate measurements, and communicate measurement results. When a measurement is initiated, a burst shaper 804 accesses a template memory 806 to determine waveform parameters and/or a burst shape (e.g., a frequency band, envelope shape, for each individual burst, together with an inter-burst interval for the composite burst). The shaper 804 controls a transmit driver 808 to generate the desired burst waveform via a piezoelectric transducer 810. As the piezoelectric transducer 810 receives echoes, a receiver circuit 812 amplifies, filters, and digitizes the receive signal. A set of correlators 814 is configured by the template memory 806 to operate on the digitized receive signal to detect the presence of echo signals. A combination detector 816 operates on the correlation signals to identify composite burst signals based on their signatures (suitable combinations of frequency bands and inter-burst intervals). A signal processor 818 combines measurements from multiple bursts to determine source-specific time-of-flight and distance measurements, potentially accounting for Doppler shifts to achieve improved accuracy. The interface 802 communicates the measurements to the system controller.

In another contemplated embodiment, the correlator outputs are provided to an ECU, which provides additional signal processing to improve reliability (e.g., noise suppression) and combines measurements from multiple channels to increase flexibility (e.g., by enhancing channel separation, or triangulating to determine obstacle position).

Figure 9:
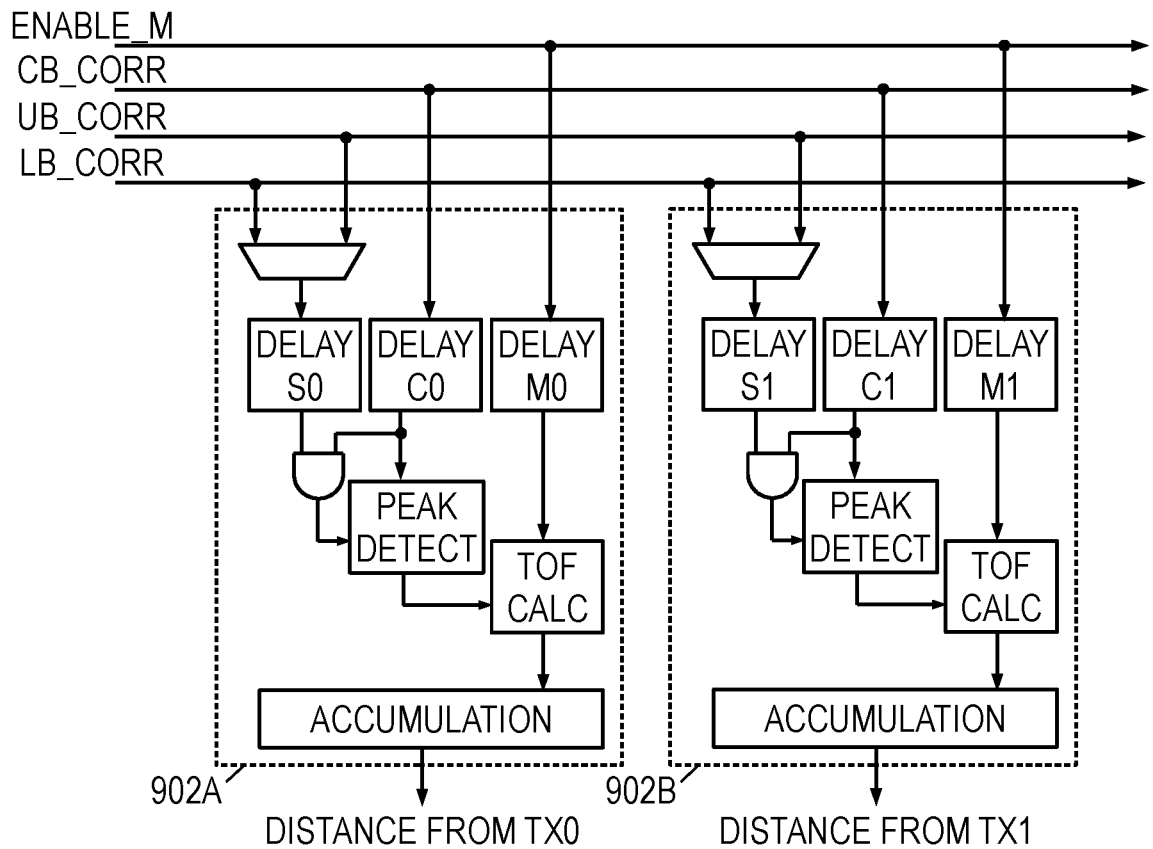
FIG. 9 is a function block diagram of an illustrative signature detector.

FIG. 9 shows an illustrative configuration for a combination detector 816. A signature identifier 902A-902B is included for each source signature to be identified. In the illustrated embodiment, each identifier 902 includes a multiplexer that selects either the upper band correlation signal (UB_CORR) or the lower band correlation signal (LB_CORR) to be combined with the center band correlation signal (CB_CORR). The selected signal passes through a delay element DELAY_Sx as the center band correlation signal passes through another delay element DELAY_Cx. The two delay elements are configured to remove the inter-burst interval, thereby aligning individual bursts of the composite burst having that inter-burst interval. A logical AND gate combines the aligned correlation signals, enabling operation of a peak detector on the center band correlation signal. (Since the signal-to-noise ratio is best in the center band, this correlation signal is preferred for determining the time of flight. Upon detecting a peak, the peak detector stops a time-of-flight counter that was reset and started by assertion of the enable measurement signal (ENAB), thereby providing a time-of-flight measurement. (A third delay element DELAY_Mx may be set in relation to the first two delay elements DELAY_Sx and DELAY_Cx to correct elapsed time measurement for any timing offsets caused by implementation of the correlators, thereby providing an accurate time of flight measurement.) An "accumulation" block represents operation of a signal processor to combine multiple measurements for improved accuracy and determination of a corresponding distance.

Figure 10:
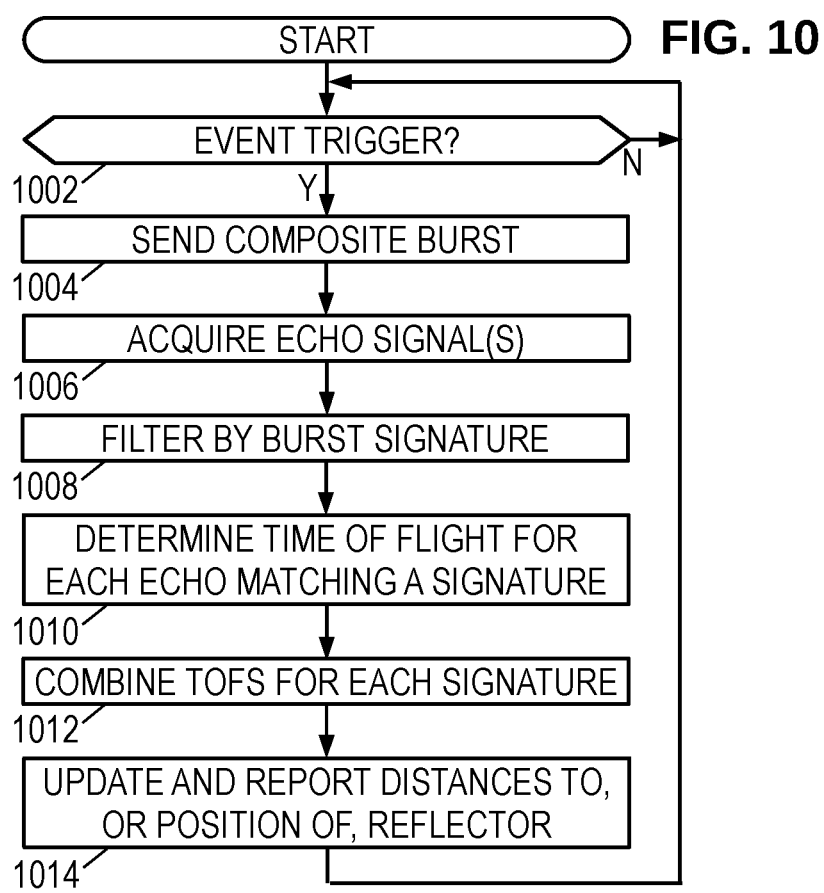
FIG. 10 is a flow diagram for an illustrative sensing method.

FIG. 10 is a flow diagram for an illustrative sensor control method. It begins in block 1002 with the control logic or interface detecting a measurement command or other indication that a measurement should be made. In block 1004, the sensor transmits a composite burst as described previously, and opens a measurement window by asserting an enable signal. In block 1006, the sensor acquires a receive signal potentially including echoes of the composite burst. In block 1008, the sensor filters the receive signals to detect echoes having the proper burst signatures. In block 1010, the sensor determines the time of flight for echoes with the proper burst signatures. In block 1012, the sensor combines measured time-of-flight for multiple echoes to determine a reliable distance measurement. In block 1014, the sensor uses the most recent measurements to update register values regarding the distance/position of reflectors. In some embodiments, this operation may employ triangulation using distance measurements from different sensors.

The above paragraphs disclose, inter alia, the use of side bands to provide multi-channel coding for ultrasonic sensors, thereby achieving strong suppression of cross talk between sensors. Because separate frequency bands are used for measuring time of flight and encoding source identity, each sensor can achieve the same distance performance as a single-sensor system without any loss of resolution, providing all sensors with equal magnitudes and equivalent performance with respect to Doppler shift. This characteristic enables the system controller to reliably combine information from different sensors, improving the performance of the system as a whole.

Though the operations shown and described in FIG. 10 are treated as being sequential for explanatory purposes, in practice the method may be carried out by multiple integrated circuit components operating concurrently and perhaps even speculatively to enable out-of-order operations. The sequential discussion is not meant to be limiting. Moreover, the foregoing embodiments may omit complicating factors such as parasitic impedances, current-limiting resistors, level-shifters, line clamps, etc., which may be present but do not meaningfully impact the operation of the disclosed circuits. Still further, the focus of the foregoing discussions has been ultrasonic sensors, but the principles are applicable to any acoustic sensors or other pulse-echo transducers that may potentially interfere with each other if operated in parallel. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. An acoustic sensing method that comprises:
   driving an acoustic transducer to send composite acoustic bursts each including multiple individual bursts, each individual burst associated with a frequency band, the composite acoustic bursts each having a burst signature that comprises a source-specific arrangement of said frequency bands;
   receiving echo signals including self-generated echoes responsive to the composite acoustic bursts from the transducer, and potentially including extra echoes responsive to acoustic bursts from other sources;
   categorizing received echo signals by source based on the burst signature; and
   using the self-generated echoes exclusive of the extra echoes to determine a distance or time of flight from the transducer.

2. The method of claim 1, wherein said categorizing includes identifying extra echoes responsive to composite acoustic bursts having a second burst signature associated with a second sensor.

3. The method of claim 2, further comprising determining, based on the identified extra echoes, a distance or time of flight from the second sensor to the acoustic transducer.

4. The method of claim 1, wherein at least one frequency band in the burst signature is a center-band of the transducer.

5. The method of claim 4, wherein at least one frequency band in the burst signature is a lower-band of the transducer.

6. The method of claim 4, wherein at least one frequency band in the burst signature is an upper-band of the transducer.

7. The method of claim 4, wherein the composite acoustic burst consists of two individual bursts.

8. The method of claim 7, wherein a second of the two individual bursts begins before residual reverberation of a first individual burst ceases.

9. The method of claim 7, wherein the burst signature further comprises a source-specific inter-burst interval.

10. A sensor suitable for use in a sensor array, the sensor comprising:

an acoustic transducer that sends composite acoustic bursts having a burst signature and that receives echo signals, the echo signals including self-generated echoes responsive to the composite acoustic bursts from the transducer, and potentially including extra echoes responsive to acoustic bursts from other sources; and a controller that categorizes the received echo signals by source based on the burst signature and that determines a distance or time of flight from the transducer using only the self-generated echoes, wherein the composite acoustic burst comprises multiple individual bursts each having an associated frequency band, and wherein the burst signature comprises a source-specific arrangement of associated frequency bands.

11. The sensor of claim 10, wherein at least one frequency band in the burst signature is a center band of the transducer.

12. The sensor of claim 11, wherein at least one frequency band in the burst signature is a lower band of the transducer.

13. The sensor of claim 11, wherein at least one frequency band in the burst signature is an upper band of the transducer.

14. The sensor of claim 11, wherein the composite acoustic burst consists of two individual bursts.

15. The sensor of claim 14, wherein a second of the two individual bursts begins before residual reverberation of a first individual burst ceases.

16. The sensor of claim 14, wherein the burst signature further comprises an inter-burst interval.

17. The sensor of claim 10, wherein the controller further employs a second burst signature associated with a second sensor in the array to categorize extra echoes responsive to acoustic bursts from the second sensor.

18. The sensor of claim 17, wherein the controller further determines a distance or time of flight from the second sensor to the acoustic transducer using only the extra echoes from the second sensor.

19. The sensor of claim 10, wherein the acoustic transducer is a piezoelectric element.

20. A sensor array comprising:
an electronic control unit;
a first acoustic transducer that sends composite acoustic bursts having a first burst signature, that receives echo signals including self-generated echoes responsive to the composite acoustic bursts from the first transducer; and a second acoustic transducer that sends composite acoustic bursts having a second burst signature, and that receives echo signals including self-generated echoes responsive to the composite acoustic bursts from the second transducer, wherein the composite acoustic burst comprises multiple individual bursts each having an associated frequency band, wherein the first and second burst signatures comprise distinct arrangements of associated frequency bands, wherein the first and second acoustic transducers each include a center band correlation filter and at least one of an upper band correlation filter and a lower band correlation filter, and wherein the electronic control unit receives output signals from the correlation filters, categorizes the received echo signals based on the burst signatures, and determines a distance or time of flight from each of the first and second transducers using only their self-generated echoes.

21. The sensor array of claim 20, wherein the arrangement of associated frequency bands for the first burst signature is an upper band and a center band, and wherein the arrangement for the second burst signature is a lower band and the center band.

22. The sensor array of claim 21, wherein each composite acoustic burst consists of two individual bursts with no inter-burst space.

23. The sensor array of claim 20, wherein each of the first and second transducers supplies to the electronic control unit output signals from an upper band correlation filter, a center band correlation filter, and a lower band correlation filter.

* * * * *